(12) United States Patent
Foerster et al.

(10) Patent No.: US 9,502,039 B2
(45) Date of Patent: Nov. 22, 2016

(54) DYNAMIC THRESHOLD FOR SPEAKER VERIFICATION

(71) Applicant: Google Inc., Mountain View, CA (US)

(72) Inventors: Jakob Nicolaus Foerster, Oxford (GB); Diego Melendo Casado, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/188,047

(22) Filed: Jun. 21, 2016

(65) Prior Publication Data

US 2016/0300575 A1    Oct. 13, 2016

Related U.S. Application Data

(63) Continuation of application No. 14/340,720, filed on Jul. 25, 2014, now Pat. No. 9,384,738.

(60) Provisional application No. 62/016,384, filed on Jun. 24, 2014.

(51) Int. Cl.
*G10L 17/00* (2013.01)
*G10L 15/00* (2013.01)
(Continued)

(52) U.S. Cl.
CPC ............... *G10L 17/20* (2013.01); *G06F 3/167* (2013.01); *G10L 17/02* (2013.01); *G10L 17/12* (2013.01); *G10L 17/24* (2013.01); *H04M 3/385* (2013.01)

(58) Field of Classification Search
CPC ..... G10L 15/08; G10L 15/01; G10L 15/222; G10L 15/1822; G10L 17/005
USPC ....... 704/250, 233, 246, 251, 275, 231, 236, 704/E15.001, E15.005
See application file for complete search history.

(56) References Cited

U.S. PATENT DOCUMENTS 5,526,465 A    6/1996  Carey et al.
6,081,782 A    6/2000  Rabin
(Continued)

FOREIGN PATENT DOCUMENTS

| EP | 1 326 233 | 7/2003 |
|---|---|---|
| EP | 2 760 018 | 7/2014 |
| WO | 2014/048855 | 4/2014 |

OTHER PUBLICATIONS

Akbacak et al., "Environmental Sniffing: Noise Knowledge Estimation for Robust Speech Systems," IEEE Transactions on Audio, Speech and Language Processing, 15(2):465-477, Feb. 2007.

(Continued)

*Primary Examiner* — Charlotte M Baker
(74) *Attorney, Agent, or Firm* — Fish & Richardson P.C.

(57) ABSTRACT

Methods, systems, and apparatus, including computer programs encoded on a computer storage medium, for a dynamic threshold for speaker verification are disclosed. In one aspect, a method includes the actions of receiving, for each of multiple utterances of a hotword, a data set including at least a speaker verification confidence score, and environmental context data. The actions further include selecting from among the data sets, a subset of the data sets that are associated with a particular environmental context. The actions further include selecting a particular data set from among the subset of data sets based on one or more selection criteria. The actions further include selecting, as a speaker verification threshold for the particular environmental context, the speaker verification confidence score. The actions further include providing the speaker verification threshold for use in performing speaker verification of utterances that are associated with the particular environmental context.

20 Claims, 3 Drawing Sheets

(51) Int. Cl.

| | | |
|---|---|---|
| *G10L 25/00* | (2013.01) | |
| *G10L 17/20* | (2013.01) | |
| *G10L 17/24* | (2013.01) | |
| *G06F 3/16* | (2006.01) | |
| *G10L 17/02* | (2013.01) | |
| *H04M 3/38* | (2006.01) | |
| *G10L 17/12* | (2013.01) | |

(56) References Cited

U.S. PATENT DOCUMENTS

| | | |
|---|---|---|
| 6,107,935 A | 8/2000 | Comerford et al. |
| 6,253,179 B1 | 6/2001 | Beigi et al. |
| 6,735,562 B1 | 5/2004 | Zhang et al. |
| 6,973,426 B1 | 12/2005 | Schier et al. |
| 7,203,652 B1 | 4/2007 | Heck |
| 7,415,410 B2 | 8/2008 | Campbell et al. |
| 7,457,745 B2 | 11/2008 | Kadambe et al. |
| 7,617,102 B2 * | 11/2009 | Mokhtari ............... G10L 17/02 704/236 |
| 7,933,226 B2 | 4/2011 | Woodruff et al. |
| 7,949,536 B2 | 5/2011 | Mowatt et al. |
| 8,005,668 B2 | 8/2011 | Arun |
| 8,060,366 B1 | 11/2011 | Maganti et al. |
| 8,311,820 B2 | 11/2012 | Ranjan |
| 8,639,508 B2 | 1/2014 | Zhao et al. |
| 8,775,191 B1 | 7/2014 | Sharifi et al. |
| 2001/0041982 A1 | 11/2001 | Kawasaki et al. |
| 2002/0002465 A1 | 1/2002 | Maes |
| 2003/0088414 A1 | 5/2003 | Huang et al. |
| 2003/0110034 A1 | 6/2003 | Runge et al. |
| 2004/0199388 A1 | 10/2004 | Armbruster et al. |
| 2009/0006093 A1 | 1/2009 | Das |
| 2011/0161084 A1 | 6/2011 | Lin et al. |
| 2011/0320201 A1 * | 12/2011 | Kaufman ............... G10L 17/04 704/251 |
| 2015/0039305 A1 | 2/2015 | Huang |
| 2015/0221305 A1 | 8/2015 | Sharifi |

OTHER PUBLICATIONS

International Search Report and Written Opinion in International Application No. PCT/US2015/028859, mailed Aug. 12, 2015, 14 pages.

Pradeep, "Text Dependent Speaker Recognition Using MFCC and LBG VQ", 2007, Thesis, Department of Electronics & Communication Engineering, National Institute of Technology, Rourkela, pp. 1-61.

\* cited by examiner

DYNAMIC THRESHOLD FOR SPEAKER VERIFICATION

CROSS REFERENCE TO RELATED APPLICATION

This application is a continuation of U.S. application Ser. No. 14/340,720, filed Jul. 25, 2014, which claims the benefit of U.S. Patent Application No. 62/016,384, filed Jun. 24, 2014, the contents of both are incorporated by reference.

TECHNICAL FIELD

This disclosure generally relates to speaker verification.

BACKGROUND

A hotword is a particular word that a user may speak to invoke the attention of a computing device before the user speaks a voice command. A computing device may always be listening for a hotword and, when the hotword is received, the computing device may process a subsequently received utterance as a voice command.

In one example, a computing device may listen for the hotword, "Ok computer." When a user states, "Ok computer, write a message." the computing device may detect the hotword "ok computer," which may cause the phrase "write a message" to be processed as a voice command.

SUMMARY

According to one innovative aspect of the subject matter described in this specification, a user device receives an utterance that is spoken by a user. The user device determines whether the utterance includes a hotword, and performs speaker verification to identify whether the speaker of the utterance is an authorized user of the device or an imposter. In performing speaker verification, the user device generates a confidence score for the utterance based on the similarity of the utterance to a voice template associated with an authorized user, and compares the confidence score to a threshold. Furthermore, the user device also identifies the environmental context associated with the utterance, such as the amount of background noise, and transmits a data set indicating the environmental context and the confidence score to a server, for further processing.

The server analyzes the data set, as well as data sets from other devices, and clusters the data sets by similar environmental context. The server selects a particular data set in each cluster, and selects, as a threshold, the confidence score associated with that data set.

One way to select a data set is to use an empirically defined target rejection rate based on the idea that a particular percentage of the utterances should be accepted. The server pairs the confidence score of the selected data set with the corresponding environmental context and provides the confidence score as a threshold for the corresponding environmental context to the user device as well as other user devices. The threshold represents the cutoff confidence score for verifying a speaker for a particular environmental context. With different thresholds for different environmental contexts, the user device may require a higher confidence score when attempting to recognize a user's voice in one environmental context such as a low noise environment, and may require a lower confidence score when attempting to recognize a user's voice in another environmental context, such as a high noise environment.

In general, another innovative aspect of the subject matter described in this specification may be embodied in methods that include the actions of receiving, for each of multiple utterances of a hotword, a data set including at least (i) a speaker verification confidence score associated with the utterance, and (ii) environmental context data associated with the utterance; selecting from among the data sets, a subset of the data sets that are associated with a particular environmental context; selecting a particular data set from among the subset of data sets based on one or more selection criteria; selecting, as a speaker verification threshold for the particular environmental context, the speaker verification confidence score included in the particular data set; and providing the speaker verification threshold for use in performing speaker verification of utterances that are associated with the particular environmental context.

These and other embodiments can each optionally include one or more of the following features. The environmental context data specifics an amount of noise detected immediately preceding receipt of the utterance. The environmental context data specifies a loudness of the utterance. The environmental context data specifies a signal-to-noise ratio of a loudness of an audio signal that encodes the utterance. The one or more selection criteria is an empirically defined rejection rate. The actions include labeling the data sets with a post trigger accuracy indicator associated with the utterance. The actions include labeling the data sets with different, second speaker verification confidence score. The data sets each further includes an audio signal that encodes the utterance. The action of selecting from among the data sets, a subset of the data sets that are associated with a particular environmental context includes: determining an environmental context data range; and selecting the subset of the data sets that includes the environmental context data associated with the utterance within the environmental context data range.

The action of selecting a particular data set from among the subset of data sets based on one or more selection criteria includes: determining a threshold based on the one or more selection criteria; and identifying the particular data set from among the subset of data sets that satisfies the threshold by less than other data sets in the subset of data sets. The actions include selecting from among the data sets, a plurality of subsets of the data sets that are each associated with a respective particular environmental context; selecting, based on the one or more selection criteria, a plurality of particular data sets, each particular data set being from among a respective subset of the data sets; selecting, as a plurality of speaker verification thresholds, each of the speaker verification threshold being for the respective particular environmental context, a plurality of speaker verification confidence scores included in each particular data set; and providing the plurality of speaker verification thresholds for use in performing speaker verification of utterances that are associated with the respective particular environmental context.

The actions include selecting from among the data sets, a plurality of subsets of the data sets that are each associated with a respective user; selecting, based on the one or more selection criteria, a plurality of particular data sets, each particular data set being from among a respective subset of the data sets; selecting, as a plurality of speaker verification thresholds, each of the speaker verification threshold being for the respective user, a plurality of speaker verification confidence scores included in each particular data set; and providing the plurality of speaker verification thresholds for use in performing speaker verification of utterances that are associated with the respective user. The action of providing the speaker verification threshold for use in performing speaker verification of utterances that are associated with the particular environmental context includes providing, to a user device, an environmental context data range and a speaker verification threshold for the environmental context data range.

Other embodiments of this aspect include corresponding systems, apparatus, and computer programs recorded on computer storage devices, each configured to perform the operations of the methods.

Particular embodiments of the subject matter described in this specification can be implemented so as to realize one or more of the following advantages. A device can identify a speaker in noisy environments.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
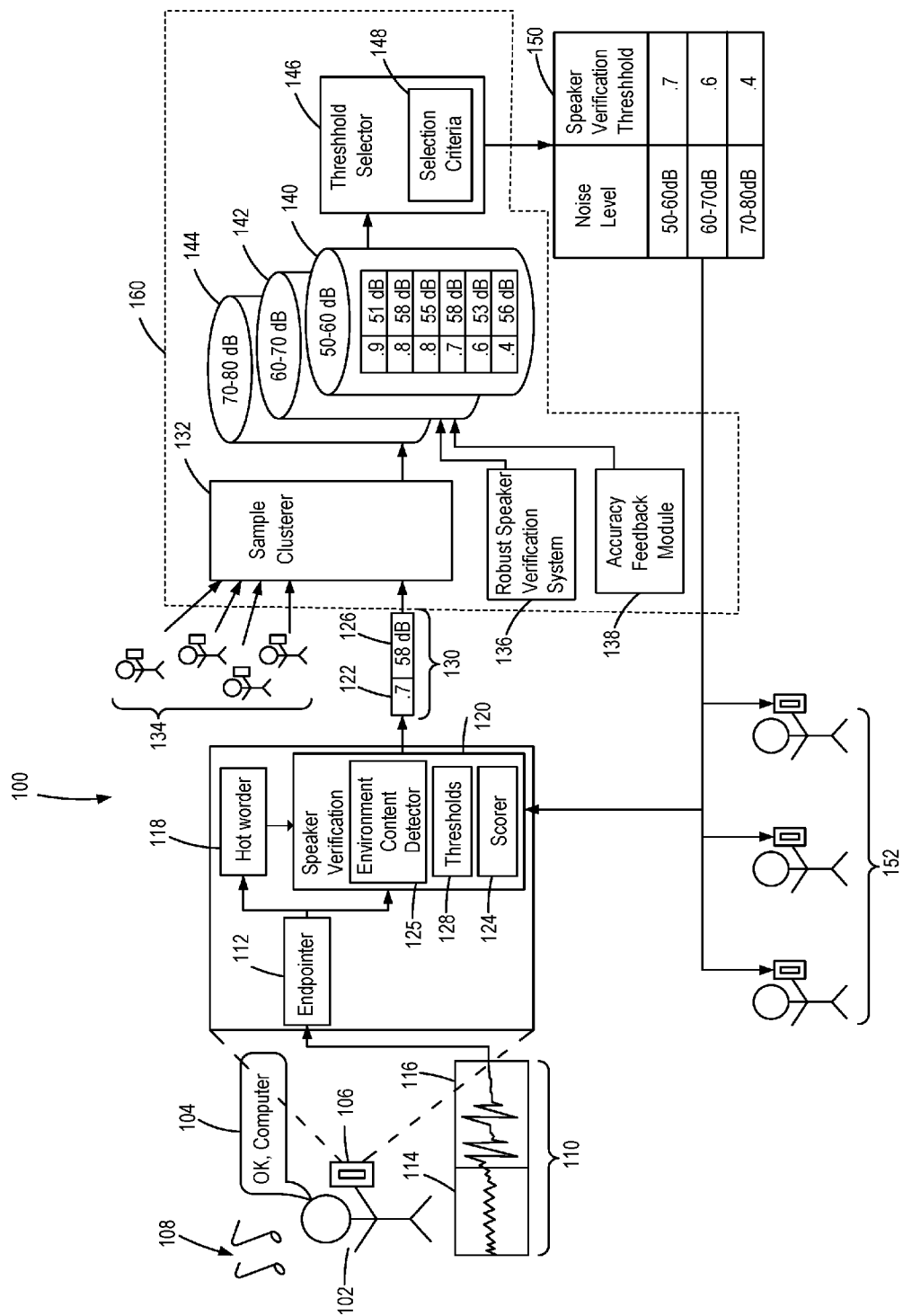
FIG. 1 is a diagram of an example system for speaker verification.

FIG. 1 is a diagram of an example system 100 for speaker verification. In general, diagram 100 illustrates a user 102 speaking an utterance 104 into a microphone of a computing device 106. The computing device 106 processes the utterance 104 and collects data associated with the surrounding environment 108. The computing device 106 transmits data based on the utterance 104 and the environment 108 to a server 160 that includes a sample clusterer 132 and a threshold selector 146. The server 160 processes the data set based on the utterance 104 as well as data based on other utterances to identify a speaker verification threshold for verifying the voice of a user in the surrounding environment 108 and similar environments. In some implementations, verifying the voice of the user can also include identifying the voice of the user.

Before using the speaker verification feature of the computing device 106, the user 102 trains the computing device 106 to recognize the user's voice. To train the computing device 106, the user 102 repeats several phrases as prompted by the computing device 106. The phrases may include the hotword as well as other words and phrases. For example, the computing device 106 may prompt the user to say "Ok computer," "open," "call," "message" and other words. The computing device 106 processes the audio from the user's voice to create a voice template that the computing device 106 can use to compare when the computing device 106 receives audio through the microphone. The computing device 106 may be a desktop computer, laptop computer, smartphone, or tablet computer.

Once the computing device 106 has a voice template for the user 102, the user can begin to speak the hotword to initiate a voice command. The computing device 102 may be in a locked state with the microphone active and processing audio received through the microphone. The computing device 106 receives the audio received through the microphone and stores the audio in a buffer. The computing device 106 may store on the previous few seconds of audio in the buffer. For example, the computing device 106 may store five seconds of audio. Instead of being in a locked state, the computing device 102 may be in an unlocked state. In this instance the microphone may still be active and the computing device 106 can store and receive a particular amount of audio in the buffer. In the example illustrated in FIG. 1, the user 102 speaks "Ok computer" into the computing device 106. The computing device 106 receives the audio of the user's voice and the audio received through the microphone before the user spoke and stores the buffered audio 110 for further processing.

In some implementations, an endpointer 112 receives the buffered audio 110 from the buffer of the computing device 106. The endpointer 112 may be implemented in software executed by one or more processors of the computing device 106. The endpointer 112 identifies the audio frames of the buffered audio 110 that separate speech and non-speech and those audio frames are endpoints. In the example illustrated in FIG. 1, the buffered audio 110 includes non-speech audio 114 and speech audio 116. The non-speech audio 114 corresponds to the audio received by the microphone before the user began speaking, and the speech audio 116 corresponds to the user speaking. For example, the non-speech audio 114 corresponds to noise picked up by the microphone before the user 102 began speaking, and the speech audio 116 corresponds to the user speaking "Ok computer."

In some implementations, instead of the endpointer 112 receiving the buffered audio 110 from the buffer of the computing device 106, a neural network module receives the buffered audio 110. The neural network module may be implemented in software executed by one or more processors of the computing device 106. The neural network module analyzes the buffered audio 110 to identify an audio frame that separates speech from non-speech. In the example illustrated in FIG. 1, the neural network identifies the audio frame that separates the non-speech audio 114 from the speech audio 116.

The hotworder 118 receives the speech audio 116 from the endpointer 112 or the neural network module. Similar to the endpointer 112, the hotworder may be implemented in software executed by one or more processors of the computing device 106. The hotworder 118 compares the speech audio 112 to a hotword template and determines whether the user spoke the hotword. In some implementations, a computing device, such as the server 160, may generate the hotword template from multiple users speaking the hotword and combining each hotword audio segment. The hotword template may be an average of the hotword audio segments as spoken by the multiple users. In some implementations, the server 160 may generate the hotword template from a single user speaking the hotword. In this instance, the hotword template may be an average of multiple hotword audio segments spoken by the single user.

The speaker verification module 120 receives the buffered audio 110 from the endpointer 112 and computes a speaker verification confidence score 122. The scorer 124 of the speaker verification module 120 computes the speaker verification confidence score 122. The speaker verification confidence score 122 reflects the likelihood that the user's voice is captured in the speech audio 116. To compute the speaker verification confidence score 122, the scorer 124 compares the speech audio 116 to the voice template for the user. In some implementations, the speaker verification confidence score 122 is a value between zero and one. The higher the likelihood that the user's voice is recorded in the speech audio 116, the closer the speaker verification confidence score 122 is to one.

The environmental context detector 125 of the speaker verification module 120 analyzes the buffered audio 110 to determine the environmental context data 126 associated with the buffered audio 110. The environmental context may be related to the loudness of the non-speech audio 114, the loudness of the speech audio 116, or a ratio of the loudness of the speech audio 116 to the loudness of the non-speech audio 114. The loudness may be the decibel level of the non-speech audio 114, the speech audio 116, or the ratio of the two.

Using the speaker verification confidence score 122 and the environmental context 126, the speaker verification module 120 uses the thresholds 128 to conclude whether the speech audio 116 corresponds to the user. There may be different thresholds depending on the environmental context 126. For example if the environmental context indicates that the noises level of the non-speech audio 114 is fifty-eight decibels, then the speaker verification module 120 may use a threshold for the fifty to sixty decibel range. The speaker verification module 120 compares the threshold to the speaker verification confidence score 122 and if the speaker verification confidence score 122 satisfies the threshold, then the speaker verification module concludes that the speaker who spoke the speech audio 116 is the authorized user. In some implementations, if the speaker verification confidence score 122 is greater or equal to the threshold, then the speaker is the authorized user. For example, if the threshold is 0.7 and the speaker verification confidence score 122 is 0.7, then the computing device 106 concludes that the speaker is the authorized user.

The speaker verification module 120 stores the speaker verification confidence score 122 and the environmental context data 126 into a data set 130. In the example shown in FIG. 1, the data set 130 includes a speaker verification confidence score of 122 of 0.7 and environmental context data 126 of 58 decibels. In some implementations, the data set also includes the buffered audio 110.

A sample clusterer 132 receives the data set 130 from the computing device 106. The sample clusterer 132 may be implemented in software running on one or more processors of a server. The sample cluster 132 is capable of receiving the data set 130 from the computing device 106 through a network. The sample clusterer 132 also receives other data sets from the computing device 106 each time the hotworder 118 detects a spoken hotword and from other users 134 speaking hotwords into their respective computing devices.

In some implementations, a second speaker verification module 136 computes an additional value to add to the data set. The server 160 that includes the sample cluster 132 may also include second speaker verification module 136 that performs processes the buffered audio 110. The second speaker verification module 136 may perform a more robust analysis of the buffered audio 110 that may not be possible on a computing device 106 with limited processing capabilities. The second speaker verification module 136 computes a value similar to the speaker verification module 120 in that the value may be between zero and one and closer to one indicates a closer match between the speech audio 116 and the voice template. The sample clusterer 132 may add the speaker verification confidence score from the second speaker verification module 136 to each data set.

In some implementations, an accuracy feedback module 138 computes an additional value to the data set. The accuracy feedback module 138 may gather data collected from the user 102 regarding the user's successes and failures in using the speaker verification feature of the computing device 106. There may be instances when the user 102 speaks a hotword into the microphone of the computing device 106 and the computing device 106 does not recognize the user 102. This is considered a false rejection. Alternatively, there may be instances when an imposter speaks a hotword into the microphone of the computing device 106 and the computing device 106 inaccurately identifies the imposter as the user 102. This is considered a false acceptance. Another example of a false acceptance is when the user 102 or an imposter speaks a word that is similar to a hotword and the computing device 106 inaccurately determines that the user 102 spoke the hotword. For example, the user 102 may speak "hey scooter" and the computing device 106 incorrectly determines that the user 102 spoke "ok computer." An accurate verification of the user 102 is a true acceptance, and an accurate rejection of an imposter or non-hotword is a true rejection.

To gather feedback from the user 102, the computing device 106 may prompt the user 102 for a password or verify the user's identity by another means other than speaker verification. Once the user's identity is verified, the computing device 106 may prompt the user 102 as to whether the user 102 tried to access the computing device 106 using the speaker verification feature at particular times. The user 102 may label each access attempt as a true acceptance, a true rejection, a false acceptance, or a false rejection. The computing device 102 provides the user feedback to the accuracy feedback module 138. The accuracy feedback module 132 adds the user feedback to the data set 130.

In instances where the user 102 identifies a false rejection, the computing device may use the buffered audio 110 to further refine the voice template that is used to recognize the user 102. As an example, user 102 says, "Ok computer," and the hotworder 118 of the computing device 106 recognizes the spoken hotword. The speaker verification module 120 of the computing device 106 does not recognize the user's voice because the speaker verification score for the utterance is below the speaker verification threshold for the environmental context in which the user is speaking. The computing device 106 prompts the user 102 whether the user 102 said "Ok computer." The user 102 confirms that the user 102 said "Ok computer," and the computing device labels the utterance as a false rejection. Since the computing device did not recognize the user's voice, the speaker verification module 120 updates the voice template with the recent utterance in order to improve speaker verification for the user 102 and reduce false rejections and false acceptances.

In some implementations, the second speaker verification module 136 adds, to the data set, a label that indicates whether the data set corresponds to a true rejection, true acceptance, false rejection, or a false acceptance. In this instance, the computing device 106 includes, in the data set 130, an additional data field indicating whether the speaker verification module 120 identified the speech audio 116 as corresponding to the voice template. The second speaker verification module 136 performs additional computations on the buffered audio 110 to identify whether the speaker verification module 120 made a true rejection, true acceptance, false rejection, or a false acceptance. The second speaker verification module 136 may have more computing resources available compared to the computing resources of the computing device 106.

The sample clusterer 132 clusters the data set 130 and the other data sets according to similar environmental context data. The sample clusterer 132 determines one or more environmental context data ranges such that each environmental context data range will include a minimum number of data sets. For example, the sample clusterer 132 may have a minimum number of data sets for each environmental context data ranges of eight hundred data sets. In the example illustrated in FIG. 1, the sample clusterer 132 identified three data set clusters. Data set cluster 140 contains the data sets that have environmental context data between fifty and sixty decibels. Data set cluster 142 contains the data sets that have environmental context data between sixty and seventy decibels. Data set cluster 144 contains the data sets that have environmental context data between seventy and eighty decibels.

In some implementations, the sample clusterer 132 clusters the data set 130 and other data sets that correspond to utterances spoken by the same user. In the example shown in FIG. 1, the sample clusterer 132 may cluster data sets that correspond to utterances spoken by user 102. When clustering only data sets that correspond to utterances spoken by a particular user, the minimum number of data sets required for each environmental context may be different than when clustering data sets that correspond to utterances spoken by multiple users.

The threshold selector 146 uses a selection criteria 148 to select a particular data set from each data set cluster. The selected data set cluster is a data set that the threshold selector selects as a data set that includes the speaker verification confidence value to be used as a speaker verification confidence threshold for future speaker verification confidence values that are associated with environmental context data within the environmental context data range. In some implementations, the selection criteria is an empirically defined target rejection rate. An empirically defined target rejection rate is based on analyzing past hotword utterance data. In analyzing the past hotword utterance data, a line between authorized users speaking a hotword and imposters speaking a hotword may become apparent such that a certain percentage of past hotword utterance data is from authorized users speaking a hotword. An example empirically defined target rejection rate is seven percent. With a seven percent empirically defined target rejection rate, the threshold selector 146 ranks the data sets in each data set cluster by the speaker verification score and selects the data set that with the speaker verification score that is higher than seven percent of the data sets in the data set cluster.

In the example illustrated in FIG. 1, the threshold selector 146 identifies a data set at the seven percent target rejection rate for each of the data set cluster 140, 142, and 144. As shown in the speaker verification threshold table 150, the data set cluster 140 that contains the data sets with environmental context data between fifty and sixty decibels has, at the seven percent level, a data set that contains a speaker verification score of 0.7. The data set cluster 142 that contains the data sets with environmental context data between sixty and seventy decibels has, at the seven percent level, a data set that contains a speaker verification score of 0.6. The data set cluster 144 that contains the data sets with environmental context data between seventy and eighty decibels has, at the seven percent level, a data set that contains a speaker verification score of 0.4.

In some implementations, the threshold selector 146 may use the additional data from the accuracy feedback module 138. With the data from the accuracy feedback module 138, the threshold selector 146 ranks the data sets in each data set cluster by the speaker verification score. The threshold selector 146 may select the data set that best separates the acceptances from the rejections in each data set group and the speaker verification confidence score for the selected data set is the speaker verification confidence threshold for the environmental context data range of that data set cluster. In each data set cluster, the selected data set may be at a different percentage level. When selecting the data set that separates the acceptances from the rejections in each data set cluster, the line may not be apparent because some of the data sets are likely false rejections and false acceptances. In these instances, the threshold selector 146 may select the data set that divides the data set cluster so that most of the false rejections are on the side with the true acceptances and the false acceptances are on the side with the true rejections. The threshold selector 146 may also use the label that was added by the second speaker verification module 136 and that indicates whether the data set corresponds to a true rejection, true acceptance, false rejection, or a false acceptance in a similar fashion to the additional data from the accuracy feedback module 138.

In some implementations, the threshold selector 146 may use the additional data from the second speaker verification module 136. With the data from the second speaker verification module 136, the threshold selector 146 may rank the data sets in each data set cluster by the speaker verification confidence score from the second speaker verification module 136. The threshold selector 146 may use the empirically defined target rejection rate to divide each data set cluster. The threshold selector 146 may either select the speaker verification confidence score from the second speaker verification module 136 or the speaker verification confidence score from the second speaker verification module 120 as the speaker verification confidence threshold.

In some implementations, the threshold selector 146 may use both the additional data from the second speaker verification module 136 and the additional data from the accuracy feedback module 138. In this instance, the threshold selector 146 may rank the data sets using the speaker verification confidence score from the second speaker verification module 136 and select a data set cluster based on the additional data from the accuracy feedback module 138 as previously described. Similar to above, the threshold selector 146 may either select the speaker verification confidence score from the second speaker verification module 136 or the speaker verification confidence score from the second speaker verification module 120 as the speaker verification confidence threshold.

The threshold selector 146 provides the speaker verification threshold table 150 to the computing device 106 and other computing devices 152 for use in speaker verification. The threshold selector 146 may provide the speaker verification threshold table 150 to the computing devices on a periodic basis such as every week or as a part of other software updates. Alternatively, the threshold selector 146 may provide the speaker verification threshold table 150 to the computing devices when prompted by computing devices. The computing device 120 may request an updated speaker verification threshold table 150 if the user 102 frequently provides feedback suggesting that the speaker verification threshold module 120 has many false acceptances or false rejections. Once the computing device 120 receives the speaker verification threshold table 150, the computing device 120 stores the speaker verification threshold table 150 in the thresholds 128 for future speaker verification.

Figure 2:
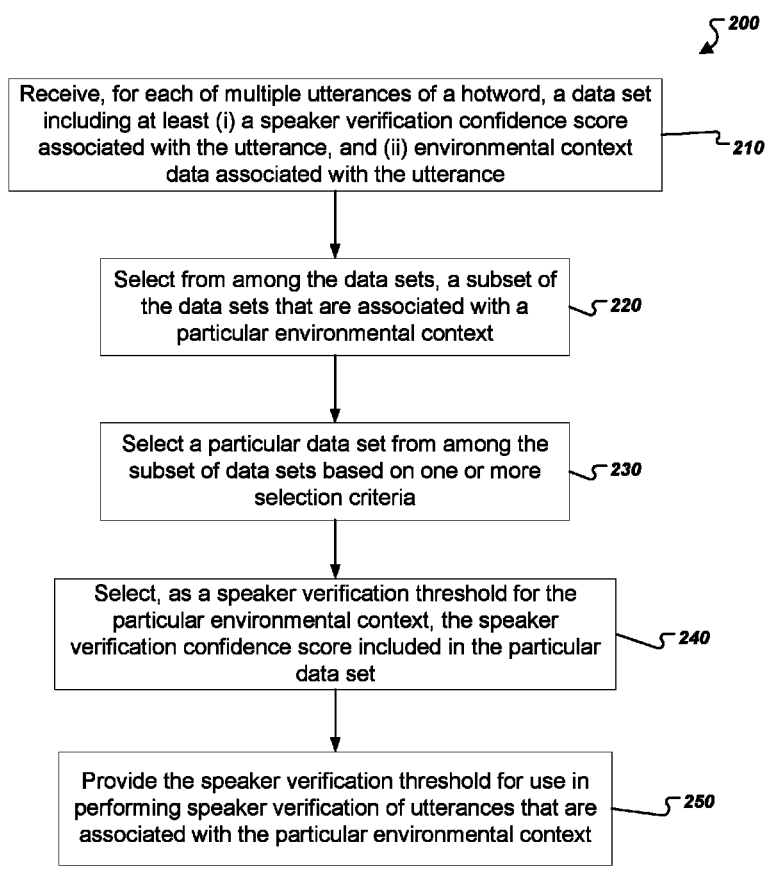
FIG. 2 is a diagram of an example process for speaker verification.

FIG. 2 is a diagram of an example process 200 for speaker verification. The process 200 may be performed by a computing device such as the server 160 that includes the sample clusterer 132 and the threshold selector 146 from FIG. 1. The process 200 analyzes data sets related to speaker verification and computes speaker verification confidence score thresholds for use in different environmental contexts.

The computing device receives, for each of multiple utterances of a hotword, a data set including at least (i) a speaker verification confidence score associated with the utterance, and (ii) environmental context data associated with the utterance (210). The data set is created by a user device that receives the utterance of the hotword from a user. The user device computes a speaker verification confidence score by comparing the hotword utterance to a voice template for the user. The user device computes environmental context data that is typically based on the noise level of the utterance. In some implementations, the environmental context data specifies an amount of noise detected by the user device for the time period before the user speaks the utterance. For example, the environmental context data may be based on the root mean square or the decibel level of the audio signal received for a particular period of time before the user speaks. In some implementations, the environmental context data may be based on the loudness of the utterance. For example, the environmental context data may be based on the root mean square or the decibel level of the utterance. In some implementations, the environmental context data may be based on a signal to noise ratio of the utterance or of a ratio of the loudness of the audio signal received for the particular period of time before the user speaks to the loudness of the utterance.

In some implementations, the computing device may add additional data to the data set. The computing device may add a post trigger accuracy indicator. The computing device may gather post trigger accuracy data after the user device makes a determination as to the verification of the user based on the audio signal. For example, the user device reject a user's attempt to use the speaker verification feature and then authenticate the user by prompting the user to enter a password. In this instance, the computing device could add to the data set that the data set represents a false rejection. In some implementations, the user device may also include the audio signal in the data set. The computing device may analyze the audio signal to compute a different, second speaker verification confidence score to include with the data set.

The computing device selects from among the data sets, a subset of the data sets that are associated with a particular environmental context (220). The computing device clusters the data sets based on the environment context data such that the clusters each include at least a minimum number of data sets. The computing device may select an environmental context data range to cluster the data sets. For example, the computing device may cluster the data sets based on the loudness of the audio signal received for a particular period of time before the user speaks.

The computing device selects a particular data set from among the subset of data sets based on one or more selection criteria (230). The computing device ranks the subset of the data sets according to the environmental context data. In some implementations, the computing device may select a particular data set based on an empirically defined target rejection rate. In some implementations, the computing device may select a particular data set based on the post trigger accuracy data. In some implementations, the computing device may rank the subset of the data sets according to the different, second speaker verification confidence score and select the particular data set based on the different, second speaker verification confidence score.

The computing device selects, as a speaker verification threshold for the particular environmental context, the speaker verification confidence score included in the particular data set (240). For example, the computing device selects, in the environmental context data range of fifty to sixty decibels, the data set with a speaker verification confidence score of 0.7. The speaker verification confidence score of 0.7 is the speaker verification confidence threshold for utterances in the fifty to sixty decibel range.

The computing device provides the speaker verification threshold for use in performing speaker verification of utterances that are associated with the particular environmental context (250). In some implementations, the computing device provides the environment context data range and the corresponding speaker verification confidence threshold as well as other environment context data ranges and corresponding speaker verification confidence thresholds to user devices for use in speaker verification.

In some implementations, the computing device may select, based on the environmental context data, subsets of the data sets that are spoken by a particular user. In this instance, the computing device identifies a speaker verification threshold for the particular user and provides the corresponding speaker verification threshold and the environmental context data to the particular user's device. The computing device may also use data from the post trigger accuracy indicator and the different, second speaker verification score to identify speaker verification threshold for the particular user.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Figure 3:
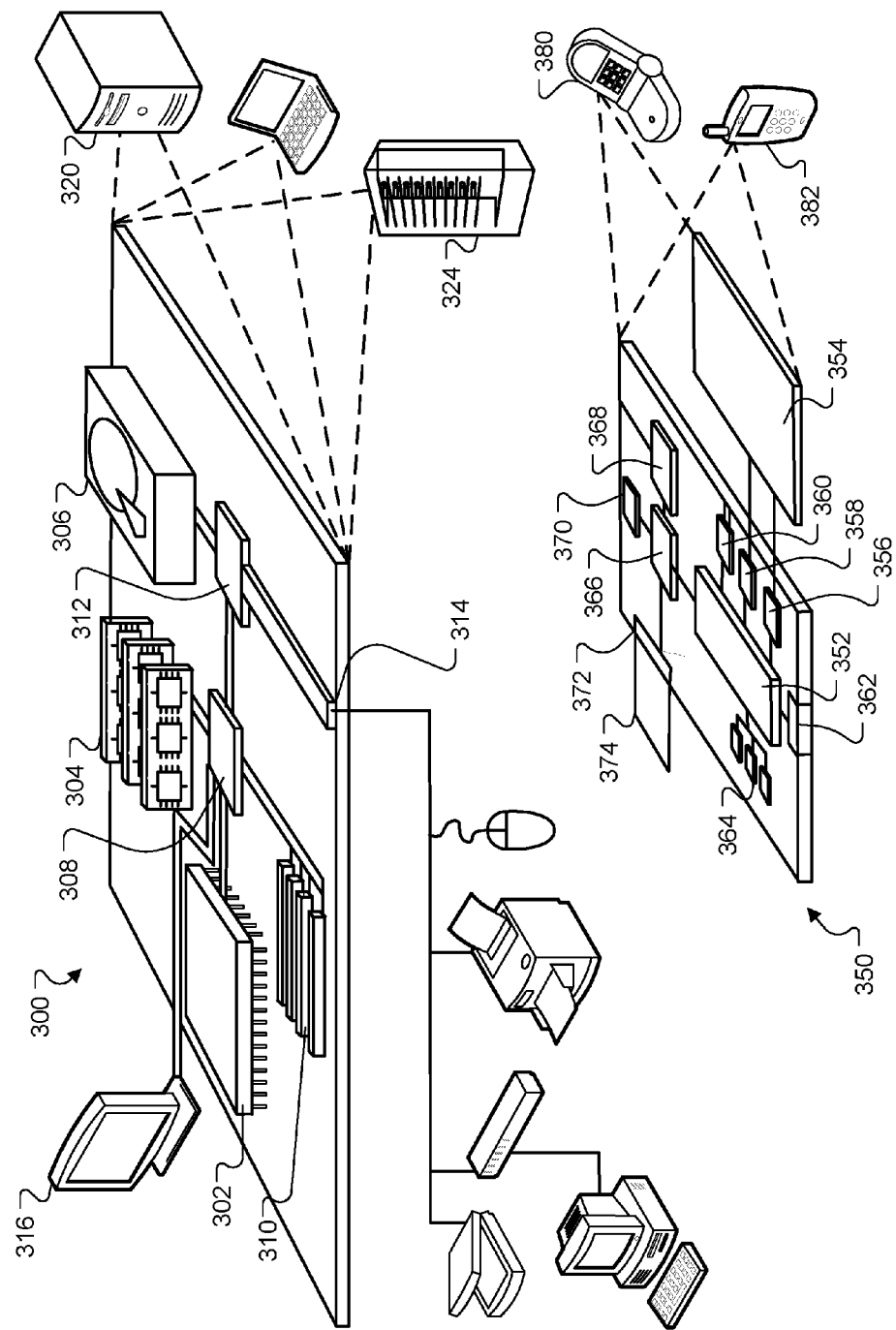
FIG. 3 shows an example of a computing device and a mobile computing device.

FIG. 3 shows an example of a computing device 300 and a mobile computing device 350 that can be used to implement the techniques described here. The computing device 300 is intended to represent various forms of digital computers, such as laptops, desktops, workstations, personal digital assistants, servers, blade servers, mainframes, and other appropriate computers. The mobile computing device 350 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as a display 316 coupled to the high-speed interface 308. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 302), perform one or more methods, such as those described above. The instructions can also be stored by one or more storage devices such as computer- or machine-readable mediums (for example, the memory 304, the storage device 306, or memory on the processor 302).

The high-speed interface 308 manages bandwidth-intensive operations for the computing device 300, while the low-speed interface 312 manages lower bandwidth-intensive operations. Such allocation of functions is an example only. In some implementations, the high-speed interface 308 is coupled to the memory 304, the display 316 (e.g., through a graphics processor or accelerator), and to the high-speed expansion ports 310, which may accept various expansion cards (not shown). In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile device (not shown), such as a mobile computing device 350. Each of such devices may contain one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a micro-drive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provide as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 352), perform one or more methods, such as those described above. The instructions can also be stored by one or more storage devices, such as one or more computer- or machine-readable mediums (for example, the memory 364, the expansion memory 374, or memory on the processor 352). In some implementations, the instructions can be received in a propagated signal, for example, over the transceiver 368 or the external interface 362.

The mobile computing device 350 may communicate wirelessly through the communication interface 366, which may include digital signal processing circuitry where necessary. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 368 using a radio-frequency. In addition, short-range communication may occur, such as using a Bluetooth, WiFi, or other such transceiver (not shown). In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, etc.) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
receiving, by a computing device that uses voice-based speaker identification, audio data corresponding to an utterance by the user of a predefined hotword;
in response to a false rejection of the audio data corresponding to the utterance, prompting the user to verify their identification using a technique other than voice-based speaker identification;
in response to the user successfully verifying their identification using the technique other than voice-based speaker identification, prompting the user to confirm that the audio data corresponding to the utterance was falsely rejected;
receiving data indicating that the user has confirmed that the audio data corresponding to the utterance was falsely rejected; and
in response to receiving the data indicating that the user has confirmed that the audio data corresponding to the utterance was falsely rejected, using the audio data in determining whether audio data corresponding to subsequently received utterances by the user of the predefined hotword are to be accepted or rejected.

2. The method of claim 1, wherein prompting the user to verify their identification using a technique other than voice-based speaker identification comprises:
prompting the user for a password.

3. The method of claim 1, comprising:
in response to the user successfully verifying their identification using the technique other than voice-based speaker identification, prompting the user to confirm that additional, previously received audio data corresponding to an additional utterance by the user of the predefined hotword was properly accepted, properly rejected, falsely accepted, or falsely rejected.

4. The method of claim 3, comprising:
receiving additional data indicating that the user has indicated that the additional, previously received audio data corresponding to the additional utterance was properly accepted, properly rejected, falsely accepted, or falsely rejected; and
in response to receiving the additional data indicating that the user has indicated that the additional, previously received audio data corresponding to the additional utterance was properly accepted, properly rejected, falsely accepted, or falsely rejected, using the additional, previously received audio data in determining whether the audio data corresponding to the subsequently received utterances by the user of the predefined hotword are to be accepted or rejected.

5. The method of claim 3, wherein prompting the user to confirm that additional, previously received audio data corresponding to an additional utterance by the user of the predefined hotword was properly accepted, properly rejected, falsely accepted, or falsely rejected comprises:
providing, for display and while prompting the user, data indicating a timestamp that the additional utterance was received.

6. The method of claim 1, comprising:
identifying an environmental context associated with receiving the audio data corresponding to the utterance by the user of the predefined hotword;
wherein using the audio data in determining whether audio data corresponding to subsequently received utterances by the user of the predefined hotword are to be accepted or rejected comprises using the environmental context in determining whether the audio data corresponding to the subsequently received utterances by the user of the predefined hotword are to be accepted or rejected.

7. The method of claim 6, wherein the environmental context specifies a loudness of the utterance, an amount of noise detected immediately preceding receipt of the utterance, or signal-to-noise ratio of a loudness of an audio signal that encodes the utterance.

8. A system comprising:
one or more computers and one or more storage devices storing instructions that are operable, when executed by the one or more computers, to cause the one or more computers to perform operations comprising:
receiving, by a computing device that uses voice-based speaker identification, audio data corresponding to an utterance by the user of a predefined hotword;
in response to a false rejection of the audio data corresponding to the utterance, prompting the user to verify their identification using a technique other than voice-based speaker identification;
in response to the user successfully verifying their identification using the technique other than voice-based speaker identification, prompting the user to confirm that the audio data corresponding to the utterance was falsely rejected;
receiving data indicating that the user has confirmed that the audio data corresponding to the utterance was falsely rejected; and
in response to receiving the data indicating that the user has confirmed that the audio data corresponding to the utterance was falsely rejected, using the audio data in determining whether audio data corresponding to subsequently received utterances by the user of the predefined hotword are to be accepted or rejected.

9. The system of claim 8, wherein prompting the user to verify their identification using a technique other than voice-based speaker identification comprises:
  prompting the user for a password.

10. The system of claim 8, wherein the operations further comprise:
  in response to the user successfully verifying their identification using the technique other than voice-based speaker identification, prompting the user to confirm that additional, previously received audio data corresponding to an additional utterance by the user of the predefined hotword was properly accepted, properly rejected, falsely accepted, or falsely rejected.

11. The system of claim 10, wherein the operations further comprise:
  receiving additional data indicating that the user has indicated that the additional, previously received audio data corresponding to the additional utterance was properly accepted, properly rejected, falsely accepted, or falsely rejected; and
  in response to receiving the additional data indicating that the user has indicated that the additional, previously received audio data corresponding to the additional utterance was properly accepted, properly rejected, falsely accepted, or falsely rejected, using the additional, previously received audio data in determining whether the audio data corresponding to the subsequently received utterances by the user of the predefined hotword are to be accepted or rejected.

12. The system of claim 10, wherein prompting the user to confirm that additional, previously received audio data corresponding to an additional utterance by the user of the predefined hotword was properly accepted, properly rejected, falsely accepted, or falsely rejected comprises:
  providing, for display and while prompting the user, data indicating a timestamp that the additional utterance was received.

13. The system of claim 8, wherein the operations further comprise:
  identifying an environmental context associated with receiving the audio data corresponding to the utterance by the user of the predefined hotword;
  wherein using the audio data in determining whether audio data corresponding to subsequently received utterances by the user of the predefined hotword are to be accepted or rejected comprises using the environmental context in determining whether the audio data corresponding to the subsequently received utterances by the user of the predefined hotword are to be accepted or rejected.

14. The system of claim 13, wherein the environmental context specifies a loudness of the utterance, an amount of noise detected immediately preceding receipt of the utterance, or signal-to-noise ratio of a loudness of an audio signal that encodes the utterance.

15. A non-transitory computer-readable medium storing software comprising instructions executable by one or more computers which, upon such execution, cause the one or more computers to perform operations comprising:
  receiving, by a computing device that uses voice-based speaker identification, audio data corresponding to an utterance by the user of a predefined hotword;
  in response to a false rejection of the audio data corresponding to the utterance, prompting the user to verify their identification using a technique other than voice-based speaker identification;
  in response to the user successfully verifying their identification using the technique other than voice-based speaker identification, prompting the user to confirm that the audio data corresponding to the utterance was falsely rejected;
  receiving data indicating that the user has confirmed that the audio data corresponding to the utterance was falsely rejected; and
  in response to receiving the data indicating that the user has confirmed that the audio data corresponding to the utterance was falsely rejected, using the audio data in determining whether audio data corresponding to subsequently received utterances by the user of the predefined hotword are to be accepted or rejected.

16. The medium of claim 15, wherein prompting the user to verify their identification using a technique other than voice-based speaker identification comprises:
  prompting the user for a password.

17. The medium of claim 15, wherein the operations further comprise:
  in response to the user successfully verifying their identification using the technique other than voice-based speaker identification, prompting the user to confirm that additional, previously received audio data corresponding to an additional utterance by the user of the predefined hotword was properly accepted, properly rejected, falsely accepted, or falsely rejected.

18. The medium of claim 17, wherein the operations further comprise:
  receiving additional data indicating that the user has indicated that the additional, previously received audio data corresponding to the additional utterance was properly accepted, properly rejected, falsely accepted, or falsely rejected; and
  in response to receiving the additional data indicating that the user has indicated that the additional, previously received audio data corresponding to the additional utterance was properly accepted, properly rejected, falsely accepted, or falsely rejected, using the additional, previously received audio data in determining whether the audio data corresponding to the subsequently received utterances by the user of the predefined hotword are to be accepted or rejected.

19. The medium of claim 17, wherein prompting the user to confirm that additional, previously received audio data corresponding to an additional utterance by the user of the predefined hotword was properly accepted, properly rejected, falsely accepted, or falsely rejected comprises:
  providing, for display and while prompting the user, data indicating a timestamp that the additional utterance was received.

20. The medium of claim 15, wherein the operations further comprise:
  identifying an environmental context associated with receiving the audio data corresponding to the utterance by the user of the predefined hotword;
  wherein using the audio data in determining whether audio data corresponding to subsequently received utterances by the user of the predefined hotword are to be accepted or rejected comprises using the environmental context in determining whether the audio data corresponding to the subsequently received utterances by the user of the predefined hotword are to be accepted or rejected.

* * * * *